(12) United States Patent
Stanhope et al.

(10) Patent No.: US 6,583,207 B2
(45) Date of Patent: Jun. 24, 2003

(54) LIQUID BENZOATE ESTER COMPOSITIONS AND AQUEOUS POLYMER COMPOSITIONS CONTAINING SAME AS PLASTICIZERS

(75) Inventors: Bruce Edward Stanhope, Grayslake, IL (US); William David Arendt, Libertyville, IL (US)

(73) Assignee: Velsicol Chemical Corporation, Rosemont, IL (US)

( * ) Notice: Subject to any disclaimer, the term of this patent is extended or adjusted under 35 U.S.C. 154(b) by 0 days.

(21) Appl. No.: 09/945,493

(22) Filed: Aug. 30, 2001

(65) Prior Publication Data
US 2003/0050372 A1 Mar. 13, 2003

(51) Int. Cl.$^7$ .................................................. C08K 5/10
(52) U.S. Cl. .................... 524/291; 106/33; 106/287.26; 523/122; 524/292; 524/765
(58) Field of Search ............................... 106/33, 287.26; 523/122; 524/291, 292, 765

(56) References Cited

U.S. PATENT DOCUMENTS

| 4,277,387 A | | 7/1981 | Jordan, Jr. et al. .......... 260/29.7 |
| 5,006,585 A | * | 4/1991 | DiBella ....................... 524/293 |
| 5,532,300 A | | 7/1996 | Koubek et al. ................ 524/47 |
| 5,676,742 A | * | 10/1997 | Arendt et al. ............. 106/15.05 |
| 5,990,214 A | * | 11/1999 | Arendt et al. ................ 524/296 |

* cited by examiner

Primary Examiner—Bernard Lipman
(74) Attorney, Agent, or Firm—Sidley Austin Brown & Wood LLP

(57) ABSTRACT

The addition of at least about 30 weight percent of diethylene glycol (DEG) monobenzoate or dipropylene glycol (DPG) monobenzoate to diethylene glycol (DEG) dibenzoate, which is a solid at 28° C., results in a mixture that is unexpectedly a liquid at this temperature. The resultant mixtures are effective plasticizers for aqueous polymer compositions, including adhesives and caulks.

14 Claims, No Drawings

US 6,583,207 B2

LIQUID BENZOATE ESTER COMPOSITIONS AND AQUEOUS POLYMER COMPOSITIONS CONTAINING SAME AS PLASTICIZERS

BACKGROUND OF THE INVENTION

This invention relates to liquid ester compositions. More particularly, this invention relates to mixtures comprising a diester derived from a dialkylene glycol and benzoic acid or a substituted benzoic acid and a monoester derived from at least one dialkylene glycol or other dihydric alcohol and the same acid. The weight ratio of monoester to diester in the present compositions is sufficient to cause the compositions to be liquids at 28° C. The diester is a solid at this temperature.

The liquid ester compositions of the present invention are particularly suitable plasticizers for aqueous polymer compositions useful as adhesives.

DESCRIPTION OF THE PRIOR ART

Mono- and diesters derived from benzoic acid and dialkylene glycols such as diethylene glycol and dipropylene glycol are known compounds. The use of these diesters alone and in combination with limited amounts of the corresponding monoesters as plasticizers for aqueous polymer emulsions is described in the prior art. As an example of the latter, U.S. Pat. No. 5,676,742, which issued to William Arendt on Oct. 14, 1997 describes plasticized aqueous polymer compositions useful as latex caulks. The primary plasticizer in these compositions is a diester derived from benzoic acid and diethylene and/or dipropylene glycol. Both hydroxyl groups of the diol are esterified.

In accordance with the teaching of the aforementioned patent to Arendt, a shortcoming of caulks formed from aqueous polymer compositions containing dibenzoates of diethylene- and/or dipropylene glycol as plasticizers is the greater susceptibility of the final caulk to fungal attack relative to caulks prepared using the same polymer composition and a diester of phthalic acid such as butylbenzyl phthalate as the plasticizer.

The Arendt patent teaches that even though monoesters of glycols are not considered effective plasticizers for many applications, relatively low levels of diethylene glycol (DEG) monobenzoate and/or dipropylene glycol (DPG) monobenzoate in combination with the corresponding dibenzoate as the primary plasticizer were sufficient to impart fungicidal properties to the caulks without any substantial adverse effect on the processability of the polymer compositions.

Throughout this patent the concentrations of the DEG and DPG monobenzoates in blends containing the corresponding dibenzoates are expressed in terms of a "hydroxyl number". The units for the "hydroxyl number" are understood by those skilled in the art to be milligrams of potassium hydroxide per gram of sample.

The relationship between the "hydroxyl number" and the relative concentration of monobenzoate in a monobenzoate/dibenzoate blend will be explained in greater detail in a subsequent section of this specification.

The hydroxyl numbers exhibited by the mixtures of diethylene glycol mono- and dibenzoates disclosed in the Arendt patent range from 12.1 to 58.4. This is equivalent to a concentration of diethylene glycol monobenzoate in the mixture of from 4 to 18 weight percent.

It is understood by those skilled in the art that to be effective, a water-insoluble plasticizer should be absorbed by the particles of polymer present in an aqueous emulsion of the polymer. This absorption typically results in an increase in viscosity of the polymer composition. Data in Table 6 of the aforementioned Arendt patent demonstrate significantly less of an increase in viscosity with increasing plasticizer concentration as the hydroxyl number of the plasticizer is increased, which is equivalent to an increased concentration of the corresponding monobenzoate in a monobenzoate/dibenzoate blend. One skilled in the art of polymer chemistry would conclude from these data that the monobenzoates of diethylene and dipropylene glycols are not effective plasticizers for the aqueous polymer compositions described in the patent and would not employ these monobenzoates as plasticizers in aqueous polymer compositions unless fungicidal activity was a requirement for the final product.

The use of the monobenzoate of 2,2,4-trimethyl-1,4-pentanediol as a plasticizer for polyvinyl chloride is described in U.S. Pat. No. 5,006,585, which issued to DiBella on Apr. 9, 1991. Because polyvinyl chloride is processed as a molten material, any adverse effect of the plasticizer on the viscosity or processability of aqueous polymer dispersions is not a consideration. The only criterion for the melting point of the plasticizer is that it be below the melting point of polyvinyl chloride.

The present invention is based on the following unexpected findings.

1. The addition of at least about 30 weight percent of monobenzoates of a specified class of dihydric alcohols and glycols to diethylene glycol dibenzoate, which is a solid at 28° C., results in a mixture that is a liquid at 12° C. Liquid plasticizers are advantageous relative to solid ones because liquids are easier to transport and blend. They also eliminate the need to heat aqueous polymer compositions during or following addition of the plasticizer to ensure uniform distribution of plasticizer throughout the polymer composition and absorption of the plasticizer by the emulsified polymer particles.

2. The reduction in plasticizer efficacy with monobenzoate concentration demonstrated by the data in the aforementioned Arendt patent is not observed when the concentration of monobenzoate is increased beyond the limits taught in this patent. Preferred compositions exhibit an increase in viscosity at least equivalent to that achieved using ethylene gylcol dibenzoate.

U.S. Pat. No. 5,990,214, issued on Nov. 23, 1999 to Arendt et al. discloses mixtures comprising the dibenzoates of DEG and triethylene glycol. These blends exhibit a eutectic freezing point that is below the freezing point of either component diester. No monobenzoates of these glycols are disclosed or suggested in this patent as required or optional plasticizers.

SUMMARY OF THE INVENTION

The present invention provides liquid ester compositions comprising a mixture consisting essentially of:

at least one monoester represented by a formula selected from the group consisting of $H[OR^1]_nOC(O)R^2$ and $HOR^3OC(O)R^2$; and at least one diester represented by the formula $R^2(O)COCH_2CH_2OCH_2CH_2OC(O)R^2$;

wherein said diester is a solid at 28° C., each $R^1$ is alkylene containing 2 or 3 carbon atoms; $R^2$ is phenyl or substituted phenyl, $R^3$ is alkylene containing from 2 to 8 carbon atoms, n is 2 or 3, and wherein the concentration of said monoester in said ester compositions is sufficient to render said mixture liquid at 28° C.

The concentration of monobenzoate required to yield a liquid composition is typically at least about 30 weight percent of the mono-/dibenzoate mixture. The present compositions can contain up to 99 weight percent of the present monobenzoates.

This invention also provides plasticized aqueous polymer compositions wherein the polymer is selected from the group consisting of 1) polymerized vinyl esters including but not limited to polyvinyl acetate, and copolymers of said esters with at least one olefin such as ethylene and 2) polymerized esters of ethylenically unsaturated carboxylic acids such as acrylic and methacrylic acids, including copolymers of these esters with olefins such as ethylene and styrene, and 3) condensation polymers such as polyesters and polyamides. The plasticizer comprises a liquid benzoic acid ester composition of the present invention.

DETAILED DESCRIPTION OF THE INVENTION

The Dibenzoate Ingredient

The dibenzoate present in the liquid ester compositions of this invention is diethylene glycol (DEG) dibenzoate, represented by the formula $R^2(O)COCH_2CH_2OCH_2CH_2OC(O)R^2$; wherein $R^2$ is phenyl or substituted phenyl.

Benzoic acids suitable for use in preparing the present ester compositions can be represented by the general formula HO(O)CAr, wherein Ar represents an unsubstituted or substituted phenyl radical. Substituents that can be present on the phenyl radical include but are not limited to alkyl radicals containing from 1 to about 4 carbon atoms and halogen atoms. Examples of substituted benzoic acids include but are not limited to ortho-, meta-, and para-toluic acid and the various halogenated benzoic acids such as o-chlorobenzoic acid.

The Monobenzoate Ingredient

In addition to the aforementioned dibenzoate, the liquid ester compositions of this invention include at least one monobenzoate derived from a) a dialkylene glycol containing from 4 to 6 carbon atoms or a diol containing from 2 to 8 carbon atoms, and b) benzoic acid or a substituted benzoic acid.

Preferred dihydric alcohols for preparing the monobenzoate are diethylene glycol, dipropylene glycol and dihydric alcohols containing from 3 to 6 carbon atoms. It is known that the two propylene radicals present in dipropylene glycol can exist in various isomeric forms, including $—CH_2CH_2CH_2—$, $—C(CH_3)_2—$, $—CH(CH_3)CH_2—$, and $—CH_2CH(CH_3)—$. The last two structural isomers have stereoisomeric forms.

In preferred ester compositions of this invention the hydrocarbon radicals represented by $R^1$ are ethylene or a mixture of ethylene and at least one of the isomeric propylene radicals.

The diester ingredient of the present compositions can be prepared by reacting benzoic acid, a substituted benzoic acid or the corresponding acid halide with diethylene glycol (DEG). Alternatively, other methods such as transesterification can be used to prepare the diester.

Depending upon the desired molar ratio of mono- to dibenzoate in the final product, the molar ratio of the acid or acid halide to the glycol in the initial reaction mixture is typically from 1:1 to about 1.7:1, and the reaction is continued until substantially all of the initial acid has reacted.

The preference for unsubstituted benzoic acid as a reactant for preparing both the dibenzoate and monobenzoate esters of the present compositions is based on the cost and availability of this compound.

Minimum Monobenzoate Concentrations for a Liquid Composition

While diethylene glycol dibenzoate is an effective plasticizer for organic polymers, a disadvantage of this compound as a plasticizer for polymer compositions processed at ambient temperature is that it melts at 28° C. The corresponding monobenzoates of DEG and DPG melt below 25° C., however the prior art, including the aforementioned patent to Arendt, suggests that these monobenzoates are not as useful plasticizers as the dibenzoates because they were considered less compatible than the corresponding dibenzoates with aqueous emulsions containing acrylic and/or vinyl ester polymers.

The present invention is based on the discovery that mixtures containing the dibenzoate of DEG together with at least one monobenzoate of a dihydric alcohol containing from 2 to 8 carbon atoms, DEG and/or DPG are not only liquids at ambient temperature, but, in many instances, are equally effective plasticizers for many aqueous polymer emulsions as DEG dibenzoate used alone. For this reason the preferred monobenzoate(s) can constitute up to 99 percent of the present ester compositions.

The ability of DEG dibenzoate to form liquid blends with the corresponding monobenzoate and/or the monobenzoates of other dihydric alcohols and glycols, the concentration of monobenzoate required to achieve these blends and the efficacy of these blends as plasticizers for aqueous polymer compositions are not suggested in the prior art relating to this type of plasticizer.

When the monobenzoate is diethylene glycol (DEG) monobenzoate, a minimum monobenzoate concentration of about 30 weight percent in a blend with DEG dibenzoate is required to obtain a blend that is a liquid at 12° C. Pure DEG monobenzoate exhibits a hydroxyl number of 264 and a glass transition temperature of −76° C.

A convenient method for determining the relative concentration of monobenzoates in a mixture blend containing DEG dibenzoate is by measuring the hydroxyl number of the mixture.

The procedure for determining the hydroxyl number of a compound or a mixture is described in ASTM test procedure E222, method B.

Pure DEG dibenzoate contains no unreacted hydroxyl groups, and therefore exhibits a hydroxyl number of 0. Knowing the hydroxyl number for a particular monobenzoate/dibenzoate blend, the relative concentration of monobenzoate in the blend can readily be calculated or obtained from a curve of hydroxyl number vs. weight percent monobenzoate for the particular ester pair.

The hydroxyl numbers for the DEG monobenzoate/dibenzoate blends exemplified in the aforementioned patent to Arendt range from 12.1 to 58.4. This is equivalent to a DEG monobenzoate concentration in the blend of from about 4 to about 18 percent by weight. It is not disclosed in this patent that the blend containing 58.4 weight percent of the monobenzoate is a liquid at 28° C.

Optional Ester Ingredients

In addition to the monobenzoate/dibenzoate mixtures described hereinbefore, the present ester compositions can include up to 70 weight percent of dipropylene glycol dibenzoate to enhance the desirable properties of the ester compositions, particularly lowering their freezing point.

Aqueous Polymer Compositions Suitable for Use with the Present Plasticizers

The liquid ester compositions of this invention are suitable for use with aqueous compositions containing at least one emulsified polymer. Preferred classes of monomers used to prepare aqueous polymer emulsions suitable for use with the present liquid ester compositions as plasticizers include but are not limited to 1) vinyl esters such as vinyl acetate and copolymers of these esters with olefins such as ethylene, 2) esters derived from ethylenically unsaturated acids, such as acrylic and methacrylic acids, and mono- or polyhydric alcohols, 2) condensation polymers such as polyesters and polyamides, 3) polymers derived from ethylenically unsaturated acids or their esters and ethylenically unsaturated hydrocarbons such as ethylene and styrene.

These aqueous polymer compositions are useful in numerous end-use applications, including but not limited to adhesives, caulks, coatings and polishes for a variety of applications.

The polymer selected will be determined at least in part by the intended end use of the polymer emulsion. Polymers of vinyl esters such as vinyl acetate and copolymers of these esters with olefins such as ethylene or with esters of acrylic or methacrylic acid are preferred materials for adhesives.

The aforementioned patent to Arendt relating to the dibenzoates of DEG and DPG as plasticizers in combination with small amounts of the corresponding monobenzoate discloses aqueous emulsions of acrylic polymers useful as latex caulks.

The accompanying examples demonstrate the improved level of desirable properties such as increased open time (the maximum time interval following application of an adhesive layer to a surface during which the layer will bond to a surface placed in contact with the adhesive) that can be achieved with no increase in set time. Set time is defined as the minimum time period required for an adhesive to bond to a surface in contact with the adhesive.

EXAMPLES

The compositions described in the following examples represent preferred embodiments of the present invention and should not be interpreted as limiting the invention defined in the accompanying claims. Unless otherwise specified all parts and percentages are by weight and all measurements and analyses were conducted under ambient conditions.

Example 1

This example demonstrates the physical properties of the benzoate ester blends of the present invention.

Preparation of Diethylenglycol (DEG) Dibenzoate

Mixtures containing benzoic acid, diethylene glycol and 0.25 weight percent, based on this mixture, of zirconuim carbonate as a catalyst were heated at the boiling point in a reactor equipped with heating means, a mechanical stirrer, water-cooled condenser, and a trap for collecting the condensed water formed as a by-product of the esterification reaction. The molar ratios of diethylene glycol to acid (BA:DEG Ratio) used in the preparations are recorded in Table 1. The vaporized water formed as a by-product of the reaction was condensed and removed from the reaction mixture using the trap.

The progress of the esterification reaction was monitored by periodically measuring both the acid content of the reaction mixture and the volume of condensed water collected in the trap. The reaction was discontinued when the concentration of benzoic acid was about 0.1 weight percent.

The hydroxyl number of the final ester products prepared, together with the calculated weight percent of diethylene glycol monobenzoate (DEGMB) corresponding to these values and the state of the final ester (liquid or solid) at ambient temperature, are also recorded in Table 1.

TABLE 1

Preparation of Diethylene Glycol Monobenzoate (DEGMB)/Dibenzoate Mixtures

| Plasticizer | BA:DEG Ratio | OH No. | Wt % DEGMB | State @ Ambient Temp. |
|---|---|---|---|---|
| 1[a] | 2:1 | 11.9 | 3 | Solid |
| 2 | 1.4:1 | 103 | 33 | Liquid |
| 3 | 1:4 | 261 | 95 | Liquid |

[a]prior art composition evaluated for comparative purposes

Example 2

This example demonstrates the performance of preferred ester compositions of the present invention as plasticizers for aqueous adhesive compositions containing polyvinyl acetate and an ethylene/vinyl acetate copolymer.

The polymer compositions evaluated were an aqueous emulsion containing 55 weight percent of polyvinyl acetate, available as Vinac XX-230® from Air Products and Chemicals (I), and 2) an aqueous emulsion containing 55 weight percent of an ethylene/vinyl acetate copolymer, available as Airflex 300® from Air Products and Chemicals (II).

Plasticized polymer compositions were prepared by blending one of the ester compositions described in the preceding Example 1 with one of the two preceding aqueous polymer emulsions (I or II) using a propeller-type mixer with a blade speed of 750 RPM. The mixing time was 10 minutes. The concentrations of plasticizer were 12.5 and 22.2 weight percent, based on polymer weight, for polymer emulsion I, and 4.7 and 10.5 weight percent, based on polymer weight, for polymer emulsion II.

The viscosities of the polymer compositions were measured to evaluate the efficacy of the ester compositions as plasticizers. These viscosity values are recorded in Table 2. The effect of the plasticizers on the open and set times of the adhesive compositions was also determined.

As used in this specification, "open time" refers to the time interval during which the exposed surface of the adhesive under evaluation remains sufficiently "tacky" to achieve substrate failure, as evidenced by removal of fibrous material from mating surfaces of sheets of Kraft paper which had been bonded under medium pressure using the adhesive being evaluated.

The term "set time" refers to the minimum time interval between 1) application of the adhesive on the surface of one substrate followed by immediate contact with the second substrate under medium pressure, and 2) achievement of complete substrate failure of the bonded surfaces of the Kraft paper.

Viscosity

The viscosity of each plasticized polymer composition was measured under ambient conditions using a Brookfield Model RVT viscometer. The spindle speed was 20 RPM Measurements were made 1 hour and 1 day following preparation of the composition. The results of the viscosity measurements are recorded in Table 2. The emulsions and plasticizers are identified as described in the preceding paragraphs and in Table 1.

TABLE 2

Viscosity of Aqueous Polymer Emulsions

| Polymer | Plasticizer | | Viscosity (centipoise) | |
|---|---|---|---|---|
| Emulsion[b] | Type | Concentration (%)[c] | Initial | After One Day |
| I | 1[a] | 12.5 | 4,590 | 4,580 |
| I | 2 | 12.5 | 4,560 | 4,620 |
| I | 3 | 12.5 | 6,420 | 6,600 |
| I | 1[a] | 22.2 | 11,440 | 11,480 |
| I | 2 | 22.2 | 12,880 | 12,320 |
| I | None[a] | | 2,240 | 2,420 |
| II | 1[a] | 4.7 | 1,780 | 1,620 |
| II | 2 | 4.7 | 1,800 | 1,760 |
| II | 3 | 4.7 | 1,820 | 1,700 |
| II | 1[a] | 10.5 | 3,590 | 3,550 |
| II | 2 | 10.5 | 3,595 | 3,730 |
| II | None[a] | | 945 | 810 | a = evaluated for comparative purposes only
b = see Table 1
c = based on weight of polymer The data in Table 2 demonstrate that the viscosity imparted to an aqueous polymer emulsion by diethylene glycol dibenzoate alone is not adversely affected by the presence of the corresponding monobenzoate. In many instances the viscosity of the emulsion is substantially increased, indicating absorption of the monobenzoate plasticizer by the emulsified polymer particles.

Determination of Open Time

Fifty pound weight Kraft paper that had previously been stored for at least 24 hours at ambient temperature and humidity was cut into strips measuring 1.5 by 12 inches (3.7 by 30.5 cm.) and 1 by 12 inches (2.5 by 30.5 cm.). One of the 1 inch-wide strips, hereinafter referred to as the "narrow strip", was centered on top of one of the 1.5 inch-wide strips, hereinafter referred to as the "wide strip" and the two strips were clamped together at one end. The narrower strip was then pulled away from the wider one at an angle of about 180 degrees, and a #14 wire-wound Meyers rod was placed on the upper surface of the narrower strip at the clamping point. The narrow strip was then laid over this Meyers rod. A second Meyers rod without a wire winding and exhibiting the same diameter as the #14 wire-wound rod was then secured behind the wire-wound rod and in contact with what was originally the lower surface of the narrow strip of paper. The two rods were separated by the narrow paper strip, with the non-wound rod in contact with the lower surface of the narrow strip and the wire-wound rod in contact with both the upper surface of the wide strip and the lower surface of the narrow strip. The purpose of the wireless rod was to prevent the narrow strip from returning to its original position on top of the wider one prior to application of the adhesive.

About 3 grams of the adhesive to be evaluated were deposited on the exposed surface of the wide strip adjacent to the clamp and applied as a continuous coating on this strip using a #16 wire-wound Meyers rod moving from the secured end to the unsecured end of the wide strip, leaving a small uncoated area at the free end of this strip. A stop watch was started following completion of the adhesive application.

When the time interval to be evaluated as open time had elapsed, the two #14 rods, separated by the narrow strip, were brought together. The resultant assembly was then pulled as a single unit to the free end of the wide strip over a 2-second interval and under moderate pressure. This operation resulted in the lower surface of the narrow paper strip contacting and becoming bonded to the adhesive layer.

Following a ten-second interval the two strips were pulled apart by grasping them at the uncoated areas. If some degree of substrate failure occurred, as evidenced by the transfer of fibrous material from the narrow paper strip to the adhesive layer, the adhesive is still considered "open", i.e. capable of adhering the two strips of paper together.

Once a bonded pair of strips exhibiting substrate failure had been prepared, additional pairs of strips were assembled, coated and bonded. The time interval between application of the adhesive and contact between the wide and narrow strips was increased in five second intervals until no fibrous material was observed in the adhesive layer when the strips were pulled apart. The presence of fibrous material on the adhesive is indicative of at least partial substrate failure. In subsequent tests the initial time interval of five seconds between the observations of partial and no substrate failure for a given sample was decreased until the actual time interval between application of the adhesive and the observation of adhesion loss, i.e. no substrate failure, could be determined to the nearest second. This value was recorded as the "open time".

Determination of Set Time

Set time was measured using the same test samples and equipment described in the preceding test for measuring open time. In this instance the adhesive was applied over the exposed surface of the wider strip using the #16 wire-wound Meyers rod, starting near the clamp used to join the narrow and wide sheets of paper. The #14 wire-wound Meyers rod was located directly behind the #16 wire-wound rod and on the opposite side of the narrower strip of paper, which separated the two rods. A layer of the adhesive to be evaluated followed by the narrow strip of paper was applied to the wider strip by pulling both rods, together with the narrow strip of paper between them, over the wide sheet as described in the preceding section of this example.

A stopwatch was started following application of the adhesive and the narrow paper strip. This time the bonded paper layers were pulled apart at a rate that required 30 seconds to traverse the length of the sample being evaluated. The angle between the paper strips during pulling was about 180°.

While the paper strips were being pulled apart, the mating surfaces of the strips were examined to determine the percentage of fibers that were at least partially torn from either paper strip and became bonded to the adhesive. The "set time" is the shortest time interval, measured from contact between the narrow and wide paper strips, required to achieve from 80% to 100% fiber tear in the paper strips, considered complete substrate failure.

The results of the open time and set time evaluations are recorded in the following Table 3.

TABLE 3

Open and Set Times for Plasticizers

| Polymer | Plasticizer | | | Set Time |
|---|---|---|---|---|
| Emulsion | Type | Concentration (%) | Open Time (Sec.) | (Sec.) |
| I | 1[a] | 12.5 | 25 | 7 |
| I | 2 | 12.5 | 25 | 7 |
| I | 3 | 12.5 | 115 | 9 |
| I | 1[a] | 22.2 | 35 | 8 |
| I | 2 | 22.2 | 45 | 8 |
| I | None[a] | 0 | 5 | 12 |
| II | 1[a] | 4.7 | 25 | 7 |
| II | 2 | 4.7 | 45 | 8 |
| II | 3 | 4.7 | 55 | 7 |

TABLE 3-continued

Open and Set Times for Plasticizers

| Polymer Emulsion | Plasticizer Type | Concentration (%) | Open Time (Sec.) | Set Time (Sec.) |
|---|---|---|---|---|
| II | 1[a] | 10.5 | 75 | 8 |
| II | 2 | 10.5 | 35 | 8 |
| II | None[a] | 0 | 5 | 12 | a = evaluated for comparative purposes

The data in Table 3 demonstrate that the presence of up to 95 weight percent of diethylene glycol monobenzoate in a blend with diethylene glycol dibenzoate does not adversely affect desirable properties, such as set time and open time, of the adhesive. In many instances open time is increased without any substantial decrease in set time.

That which is claimed is:

1. A liquid ester composition comprising a mixture comprising:
   at least one monoester represented by a formula selected from the group consisting of $H[OR^1]_n OC(O)R^2$ and $HOR^3OC(O)R^2$; and at least one diester represented by the formula $R^2(O)COCH_2CH_2OCH_2CH_2OC(O)R^2$; wherein said diester is a solid at 28° C., each $R^1$ is alkylene containing 2 or 3 carbon atoms; $R^2$ is phenyl or substituted phenyl, $R^3$ is alkylene containing from 2 to 8 carbon atoms, n is 2 or 3, and wherein the concentration of said monoester in said ester compositions is sufficient to render said mixture liquid at 28° C.

2. A liquid composition according to claim 1 wherein the alkylene radicals represented by $R^1$ are identical and $R^2$ is selected from the group consisting of phenyl and phenyl containing at least one substituent that is in turn selected from group consisting of methyl, ethyl, and the halogens.

3. A liquid composition according to claim 2 wherein $R^1$ is at least one member selected from the group consisting of $-CH_2CH_2-$, $-CH(CH_3)CH_2-$, and structural isomers of $-CH(CH_3)CH_2-$, $R^2$ represents phenyl and $R^3$ contains from 3 to 6 carbon atoms.

4. A liquid composition according to claim 3 wherein said monoester constitutes at least 30 percent of the combined weight of said monoester and said diester.

5. A liquid composition according to claim 4 wherein $R^1$ is $-CH_2CH_2-$ and said monoester constitutes from 30 to 99 percent of the combined weight of said monoester and said diester.

6. A liquid composition according to claim 1 wherein said composition additionally comprises up to 70 percent, based on the total weight of said composition, of dipropylene glycol dibenzoate.

7. An aqueous plasticized polymer composition comprising at least one emulsified polymer and a plasticizer, wherein said plasticizer comprises at least one monoester represented by a formula selected from the group consisting of $H(OR^1)_n OC(O)R^2$ and $HOR^3OC(O)R^2$ and at least one diester represented by the formula $R^2(O)COCH_2CH_2OCH_2CH_2OC(O)R^2$ wherein said diester is a solid at 28° C.; each $R^1$ is individually selected from the group consisting of alkylene radicals containing 2 or 3 carbon atoms; $R^2$ represents phenyl or substituted phenyl; n is 2 or 3 and wherein the concentration of said monoester is sufficient to render said composition liquid at 28° C.

8. A polymer composition according to claim 7 wherein the alkylene radicals represented by $R^1$ are identical and $R^2$ is selected from the group consisting of phenyl and phenyl containing at least one substituent that is in turn selected from the group consisting of methyl, ethyl, and the halogens.

9. A polymer composition according to claim 8 wherein $R^1$ is selected from the group consisting of $-CH_2CH_2-$, $-CH(CH_3)CH_2-$, and structural isomers of $-CH(CH_3)CH_2-$, and $R^2$ represents phenyl and $R^3$ contains from 3 to 6 carbon atoms.

10. A polymer composition according to claim 9 wherein said monoester constitutes at least 30 percent of the combined weight of said monoester and said diester.

11. A polymer composition according to claim 10 wherein $R^1$ is $-CH_2CH_2-$ and said monoester constitutes from 30 to 95 percent of the combined weight of said monoester and said diester.

12. A polymer composition according to claim 7 wherein said composition additionally comprises up to 70 percent, based on the total weight of said composition, of at least one ester selected from the group consisting of dipropylene glycol dibenzoate.

13. A polymer composition according to claim 7 wherein said emulsified polymer is selected from the group consisting of 1) polymerized vinyl esters and copolymers of said vinyl esters with ethylene, 2) polymerized esters of ethylenically unsaturated carboxylic acids and copolymers of ethylenically unsaturated carboxylic acid esters with ethylene or styrene, and 3) condensation polymers selected from the group consisting of polyesters and polyamides.

14. A polymer composition according to claim 13 wherein said emulsified polymer is selected from the group consisting of polymerized vinyl esters and copolymers of said vinyl esters with ethylene.

* * * * *